United States Patent [19]

Levine et al.

[11] 4,146,966

[45] Apr. 3, 1979

[54] ENGRAVING MACHINE FOR RINGS AND BANGLE BRACELETS

[75] Inventors: Jack W. Levine, Levittown, N.Y.; Hans Bonheim, Fairlawn, N.J.

[73] Assignee: New Hermes, Incorporated, New York, N.Y.

[21] Appl. No.: 803,508

[22] Filed: Jun. 6, 1977

[51] Int. Cl.[2] .......... B23C 1/16

[52] U.S. Cl. .......... 33/24 B; 90/62 R

[58] Field of Search .......... 33/18 B, 22, 23 R, 23 B, 33/23 D, 23 K, 24 R, 24 B, 24 C, 25 D; 90/13.1, 13.2, 62 R; 308/3 R, 3 A, 4 R

[56] References Cited

U.S. PATENT DOCUMENTS

| | | | |
|---|---|---|---|
| 2,293,134 | 8/1942 | Hallenbeck | 308/3 A |
| 2,562,269 | 7/1951 | Gruettner et al. | 33/24 B |
| 2,749,617 | 6/1956 | Gruettner | 33/25 R |
| 3,273,249 | 9/1966 | Klaassen | 33/172 R |
| 3,586,273 | 6/1971 | Sloyan | 308/3 R |
| 3,718,072 | 2/1973 | Berlant | 33/24 B |

*Primary Examiner*—Richard R. Stearns

*Attorney, Agent, or Firm*—Seidel, Gonda, Goldhammer & Panitch

[57] ABSTRACT

An engraving machine for rings and bangle bracelets is disclosed. The machine is of the type that utilizes a circular pattern carrier rotatably carried on the base of the machine. The patterns, which are carried on the periphery of the carrier, are transferred to the inner surface of a ring or bangle bracelet by way of a pantograph lever having a stylus adjacent the pattern carrier and an engraving tool adjacent the inner surface of the ring or bangle bracelet. A workholder assembly is utilized to position the ring or bangle bracelet during the engraving process. The entire workholder assembly is vertically slideable along two horizontally disposed rods, which are secured to a carrier frame. A peripheral indexable ratchet wheel is rotatably mounted to the workholder assembly and carries on it a plurality of clamping chucks which hold the rings or bangle bracelets in position. The clamping chucks are axially slideable within slots in the ratchet wheel and have interchangeable jigs removably secured to them.

8 Claims, 5 Drawing Figures

FIG. 1
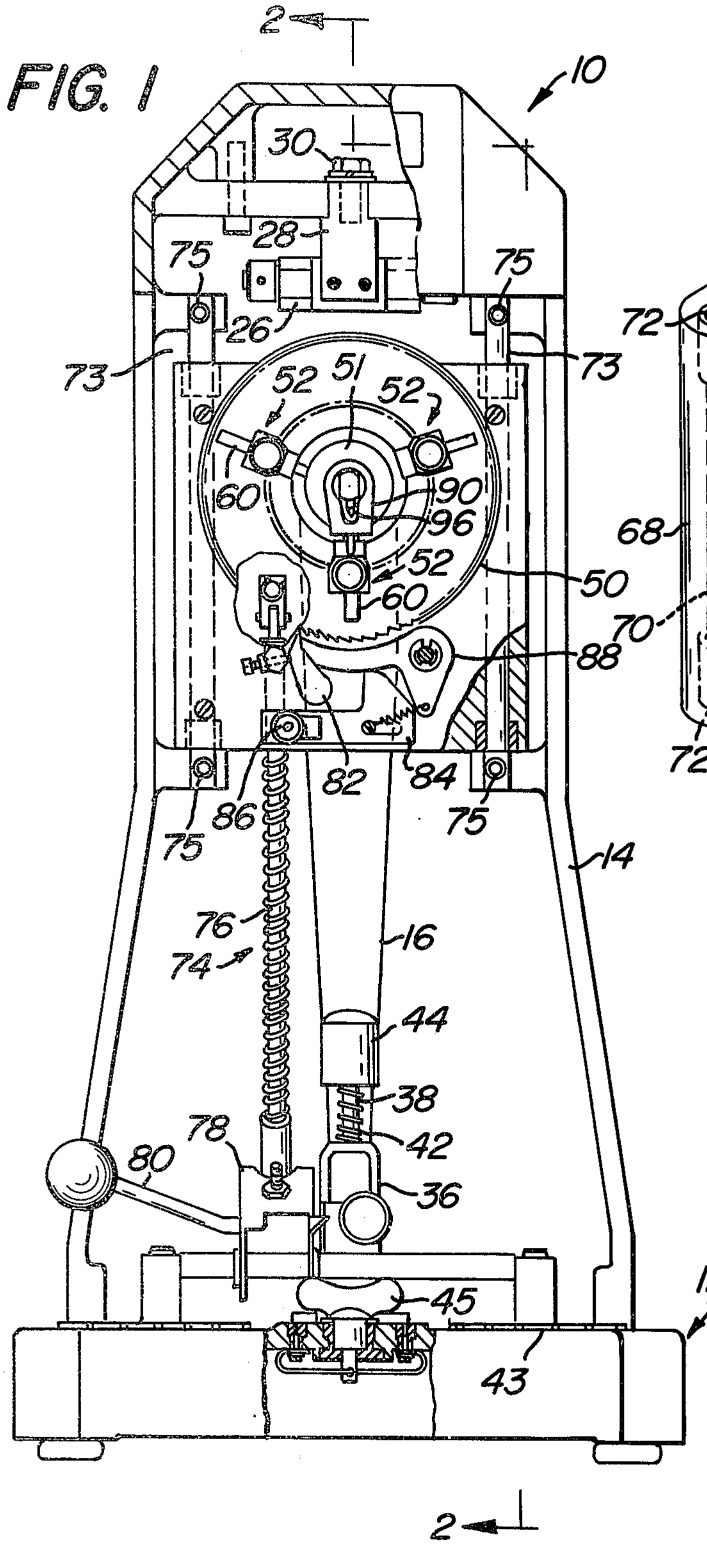
FIG. 3
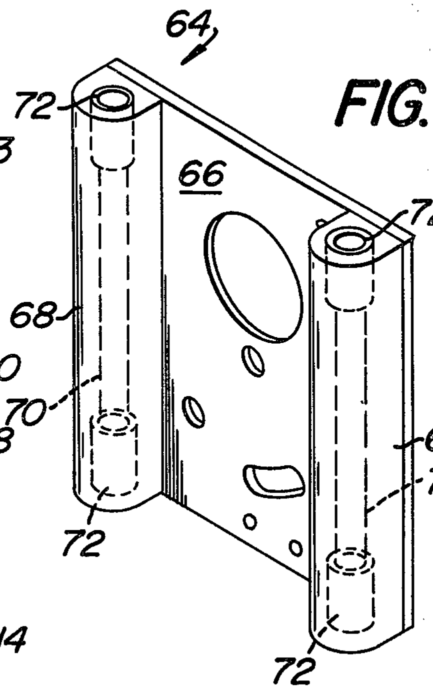
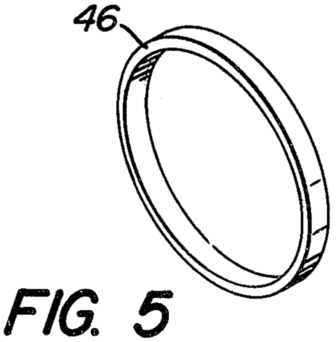
FIG. 5

ENGRAVING MACHINE FOR RINGS AND BANGLE BRACELETS

BACKGROUND OF THE INVENTION

The invention relates to the type of engraving machine disclosed in U.S. Pat. No. 2,562,269. The engraving machine disclosed therein uses a pantograph lever which has a stylus at its lower end and an engraving tool near its mid-portion. The patterns to be engraved are carried on a circular carrier and are disposed in a ring along the perimeter thereof. In using this type of machine, the character to be engraved is positioned by an indexing notch on the perimeter of the pattern carrier that cooperates with a locking member on the machine to hold the character underneath the stylus. A ring to be engraved is held by a plurality of chucks mounted to a rotatable ratchet wheel. The ratchet wheel is rotated and indexed by the movement of a pawl. A connecting rod is secured between the pawl and a slideable lock, in order to simultaneously index the ratchet wheel and lock the pattern carrier into position. After the work piece is indexed and the pattern carrier is locked into position, the stylus of the pantograph lever is utilized to trace the character on the pattern carrier thereby causing a corresponding engraving to appear on the interior surface of the ring.

The type of machine disclosed said U.S. Patent has several disadvantages and limitations. The vertical edges of the workholder slide are mounted within grooves in a pair of vertical plates. The proper sliding fit of the work holder slide is dependent upon the adjustment of a pair of screws within each of the plates. Such adjustment requires a great degree of skill and is extremely time consuming. Therefore, the original assembly of the machine is complicated, as well as any servicing which requires the removal of the workholder slide.

Another limitation of the prior machines is the limited range of ring sizes which can be engraved by the apparatus. This range is limited by the amount of travel of the chucks. The prior art machines are capable of engraving only upon standard sized rings such as wedding bands, and school and fraternity rings. Since modern jewelry is available in a wide variety of sizes and shapes, the prior art machines are incapable of engraving upon a significant portion of available jewelry.

SUMMARY OF THE INVENTION

The invention relates to an engraving machine having a frame comprised of an upright member and a base. A lever having a stylus and an engraving tool is supported by said upright member. A plate is supported by said upright member so as to allow vertical movement of the plate as well as movement outwardly from the upright member. A peripherally indexable ratchet wheel, supporting a plurality of movable clamping chucks for holding a workpiece, is mounted for rotary movement on the plate. A single indexing means is provided to index the ratchet wheel and to cause relative motion between the workpiece and the engraving tool.

Additionally, a portion of the clamping chucks can be made removable and interchangeable in order to adapt the engraving machine to various sizes of workpieces.

Generally, it is an object of the present invention to overcome the disadvantages and limitations of the prior art machines discussed above.

It is an object of the present invention to provide a work holder assembly which can be attached to the apparatus in a simple manner and with a minimum amount of adjustment.

It is another object of the invention to provide a work holder assembly which is easily removable.

It is another object of the invention to provide a work holder assembly which can pivot outwardly from its support.

It is still another object of the invention to provide clamping chucks which are interchangeable. In this way, various sizes of workpieces can be engraved by the machines of the present invention.

It is still a further object of the invention to provide an engraving tool attachment to extend the effective length of the tool. This extension will enable an engraving tool to engrave upon workpieces of the size of bangle bracelets.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a front elevation view of an engraving machine according to the invention.

FIG. 3 is a detailed view of the slide plate of the workholder assembly.

FIG. 5 illustrates a typical bangle bracelet which can be engraved by the engraving machine of the present invention.

DETAILED DESCRIPTION OF THE INVENTION

Figure 2:
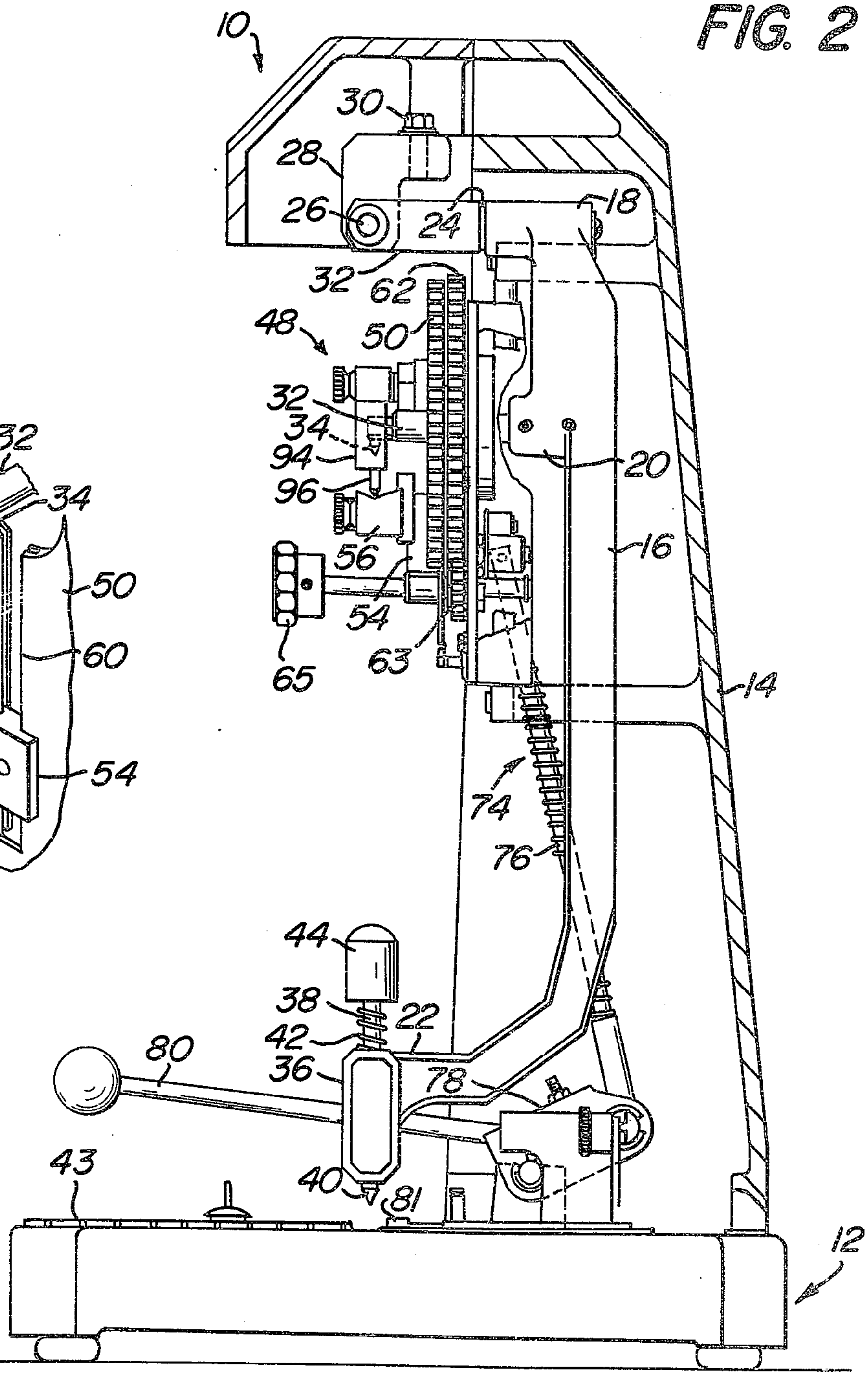
FIG. 2 is a sectional view taken along lines 2—2 in FIG. 1.

Referring to the drawings in detail, wherein like numerals indicate like elements, there is shown in FIG. 1 a front elevational view of the present invention designated generally as 10, wherein a base is designated as 12 and an upright frame is designated as 14.

A pantograph lever 16 is mounted to the upper portion of the upright frame 14 by way of a swivel arm 18. The pantograph lever 16 has a cutter and engraving arm 20 extending from its mid-portion and a stylus arm 22 extending from its lowermost end. The universal motion of a pantograph lever 16 is accomplished by mounting the swivel arm 18 for pivotal motion in one direction to a first pivot shaft 24 and for pivotable motion in a second direction to a second pivot shaft 26. The lever 16 is attached to the upright frame 14 by way of a crank shaped mount 28 which is secured to the upright frame 14 by means of a screw 30.

The engraving arm 20 has an engraver carrier 32 extending therefrom with an engraving tool 34 attached to its distal end. A stylus housing 36 is secured to the lower end of the stylus arm 22. A stylus carrier rod 38 is movably carried by the housing 36 and has a stylus 40 attached to its lower end. The carrier rod 38 is spring biased upwardly by spring 42 and has a knob 44 attached to its upper end.

A circular pattern carrier 43 is rotatably secured to the base 12 by means of a clamp 45. The pattern carrier 43 has a plurality of characters arranged in a ring along the perimeter of its face. The stylus 40 will trace desired characters from the pattern carrier 43 and the character will be simultaneously engraved on a workpiece by the engraving tool 34. The operation of the machine will be more fully explained herein.

A vertically movable workholder assembly 48 is supported in the mid-portion of the upright frame 14. A ratchet wheel 50, having a centrally located hole 51, is rotatably mounted on the workholder assembly 48. The ratchet wheel 50 is rotatable in discrete increments to a plurality of indexed positions.

A workpiece is held concentric to the axis of the ratchet wheel by means of a plurality of clamping chucks 52. The clamping chucks 52 comprise a plurality of slideable jaws 54, which are movable in a direction toward and away from the central axis of the ratchet wheel 50, and a plurality of jigs 56, which are removably mounted to the jaws 54 by screws 58. The jaws 54 are movable within radial slots 60. A rotatable gear wheel 62, having a spiral groove in its major face (as shown in FIG. 7 of the afore-mentioned patent), is mounted behind the ratchet wheel 50. A drive gear 63, which is rotated by turning handle 65, rotates the gear wheel 62. The jaws 54 have projections (not shown) which extend rearwardly to engage the spiral groove of the gear wheel 62. The rotation of the gear wheel 62 causes the projections of the jaws 54 to slide within the spiral groove. This motion of the projections moves the jaws 54 within their respective radial slots 60. A workpiece can thereby be held by sliding the jaws 54 inwardly until the jigs 56 securely engage the workpiece.

The entire workholder assembly 48 is mounted to a vertically slideable assembly 64 (FIG. 3) comprising a slide plate 66 and a pair of guide columns 68 secured to the rear thereof. Each guide column 68 has a longitudinal bore 70 completely therethrough. A bushing 72 is mounted within each end of the bores 70. The slide plate 66 is mounted for vertical movement on a pair of rods 73. The rods 73 are secured to the upright frame 14 by screws 75 and pass through the bores 70 and bushings 72 of guide columns 68. By the removal of the screws 75 from the right side of the upright 14, the assembly 64 can be pivoted a limited amount about the left rod 73. While the amount of movement is constrained, it is sufficent to allow the mechanism supported on the rear of slide plate 66 to be serviced and/or removed.

An indexing and locking mechanism 74 is provided to move and index the ratchet wheel 50 while at the same time locking the pattern carrier 43 in position on base 12. The indexing and locking mechanism 74 comprises a connecting rod 76 attached at one of its ends to workholder assembly 48 and at its other end to a bracket 78. A lever arm 80 is secured to the bracket 78 in such a manner that the downward movement of the lever arm 80 will cause the upward movement of connecting rod 76 and the work holder assembly 48 while at the same time engaging the locking member 81 to the pattern carrier 43. The downward movement of lever arm 80 will also cause rotation of indexing pawl 82. The indexing pawl 82 will engage and rotate the ratchet wheel 50 a discrete increment. The amount of rotation of the pawl 82 is controlled by an adjustable stop 84 which is movably secured to the slide 66 by a clamp 86. By selectively positioning the adjustable stop 84, the amount of rotation of the indexing pawl 82 is controlled. The amount of rotation of the ratchet wheel 50 is thereby also controlled. A retaining pawl 88 is also secured to the plate 66 and prevents the backward rotation of the ratchet wheel 50.

For further details of the locking of the pattern carrier 43, the indexing of the ratchet wheel 50 and the sliding motion of the work holder assembly 48, reference is made to U.S. Pat. No. 2,562,269, which is hereby incorporated by reference.

Figure 4:
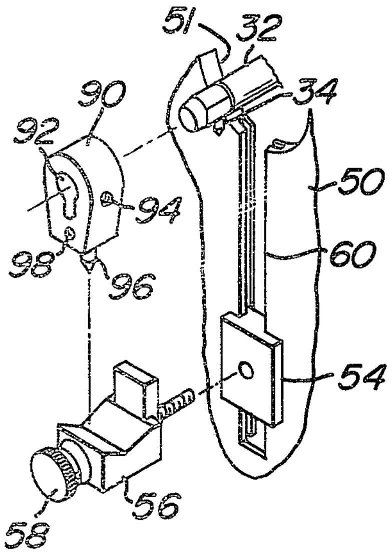
FIG. 4 is a detailed view of the removable jig and engraving tool extension.

As best seen in FIG. 4, an engraving tool extension mount 90 is provided to adapt the engraving tool to large sized workpieces such as bangle bracelet 46. The extension mount 90 has a hole 92 which is complementary with the engraver carrier 32 and the engraving tool 34. The extension mount 90 is secured to the engraver carrier 32 by means of a set screw within threaded hole 94 and carries an engraving tool 96 which is attached to the mount 90 by a second set screw within threaded hole 98. The extension mount 90 thereby provides a quick and simple means for adapting the engraving tool to large sized workpieces. Without the necessity of removing the original tool 32, the extended tool 96 can be secured to the carrier 32.

In operation, after the workpiece to be engraved has been selected, a proper sized jig 56 is chosen. A plurality of various sized jigs is provided. The clamping chucks 52 can thereby hold a wide variety of workpieces. Depending upon the size of the workpiece, the engraving tool extension mount 90 may or may not be needed. Thus, by the simple steps of selecting a jig 56 and mount 90, the engraving machine of the present invention can be adapted to engrave upon a wide variety of workpieces. In addition to being able to engrave upon standard sized workpieces such as wedding bands, the engraving machine of the present invention is capable of engraving upon large costume jewelry rings that have large and odd-shaped tops or settings with large stones. The present invention is even capable of engraving upon jewelry much larger than rings, such as bangle bracelets of approximate diameters between 2 and 3 inches.

The selected jigs 56 are attached to the jaws 54 and the workpiece is secured between the jigs 56 by rotating handle 65. Thereafter, the desired pattern carrier is secured to the base by means of the clamp 45. The operator can then begin the engraving process.

The operator selects the character to be engraved from the pattern carrier 43 and positions it adjacent to the locking member 81. He then depresses the lever 80. This engages the locking mechanism 81 to the pattern carrier, raises the work holder assembly 48 and indexes the ratchet wheel 50. He then traces the character from the pattern carrier with the stylus 40 and the engraving tool simultaneously engraves a similar character upon the workpiece. For further details of the operation of the engraving machine, reference is again made to the afore-mentioned patent.

In order to facilitate the ease of construction and serviceability of the engraving machine, a new slide assembly has been provided. The use of the rods 73 in conjunction with the guide columns 68 provide an easy and simplified way of aligning the slide plate 66 with the upright frame 14. The time consuming alignment problem of the prior art machines is thereby eliminated. Servicing of the machine is also simplified. As mentioned above, the removal of two of the screws 75 allows the slide assembly 64 to be pivoted outwardly so as to allow access to the rear of slide plate 66. The complete removal of a workholder assembly, as is required for servicing the prior art machines, is thereby eliminated.

The present invention may be embodied in other specific forms without departing from the spirit or essential attributes thereof and, accordingly, reference should be made to the appended claims, rather than to the foregoing specification as indicating the scope of the invention.

We claim:

1. An engraving machine comprising a frame having a base and an upright member, a lever means supported by said upright member, said lever means having a stylus and an engraving tool mounted thereon and being arranged such that movement of said stylus in a pattern produces a movement of the engraving tool corresponding to said pattern, a plate, means supporting said plate on said upright member for vertical movement and including means providing a pivotable connection permitting pivotable movement of said plate outwardly of said upright member to facilitate access to a rear surface of the plate, a peripherally indexable ratchet wheel mounted for rotary movement on said plate, a plurality of clamping chucks movably mounted on said ratchet wheel for holding a workpiece, and a means for simultaneously indexing said ratchet wheel and causing relative vertical motion between said workpiece and said engraving tool.

2. An engraving machine in accordance with claim 1 wherein said plate support means includes a pair of guide columns secured to said plate and a pair of rods secured to said upright member, each of said rods extending through one of said guide columns, said rods being longer than said guide columns so that said plate is slideable along said rods.

3. An engraving machine in accordance with claim 1 wherein said plate and one being mounted for pivotable movement about the axis of the other rod.

4. An engraving machine comprising a frame having an upright member and a base, a lever means supported by said upright member, said lever means having a stylus and an engraving tool mounted thereon and being arranged such that movement of said stylus in a pattern produces a movement of the engraving tool corresponding to said pattern, a peripherally indexable ratchet wheel having a plurality of movable clamping chucks for holding a workpiece, a vertically slideable plate for rotatably supporting said ratchet wheel, a pair of guide columns secured to said plate, each guide column having a longitudinal bore therethrough, a pair of vertically disposed rods secured to said upright member, each rod passing through one of said longitudinal bores and providing a slideable support for said plate, means providing for pivotable movement of said plate about the axis of one of said rods to facilitate access to a rear surface of the plate, and a single means for simultaneously indexing said ratchet wheel and causing relative vertical movement between said workpiece and said engraving tool.

5. An engraving machine comprising a frame having an upright member and a base, a lever means supported by said upright member, said lever means having a stylus and an engraving tool mounted thereon and being arranged such that movement of said sytlus in a pattern produces a motion of the engraving tool corresponding to said pattern, a work holder assembly supported by said upright member for vertical movement thereon, said work holder assembly having an indexable ratchet wheel mounted for rotary movement thereon, a plurality of movable clamping chucks mounted on said ratchet wheel for holding a workpiece, a portion of each of said chucks being removable and interchangeable in order to adapt the machine to various sizes of workpieces, means for extending the effective length of said engraving tool so that it is capable of engraving on the inner peripheral surface of a ring workpiece having a diameter of at least 2 inches, and a means for indexing said ratchet wheel and for causing relative vertical movement between said workpiece and said engraving tool.

6. An engraving machine in accordance with claim 5 wherein each of said chucks comprises a jaw slideable on said wheel in a direction toward and away from the axis of said wheel, and the removable portion of said chuck being a jig removably secured to each of said jaws, the number of jigs exceeding the number of jaws so that various size jigs may be substituted for one another to adapt the machine to various sizes of workpieces.

7. An engraving machine in accordance with claim 5 wherein said means for extending the effective length of said engraving tool comprises an extension block, said extension block being detachably mounted over the engraving tool and having a second engraving tool extending from a peripheral surface thereof.

8. An engraving machine in accordance with claim 7 wherein said engraving tool is supported on the end of a carrier arm, said extension block having a hole adapted to fit over said end of said carrier arm and the engraving tool supported by said end of said carrier arm.

* * * * *